United States Patent Office 3,405,952
Patented Oct. 15, 1968

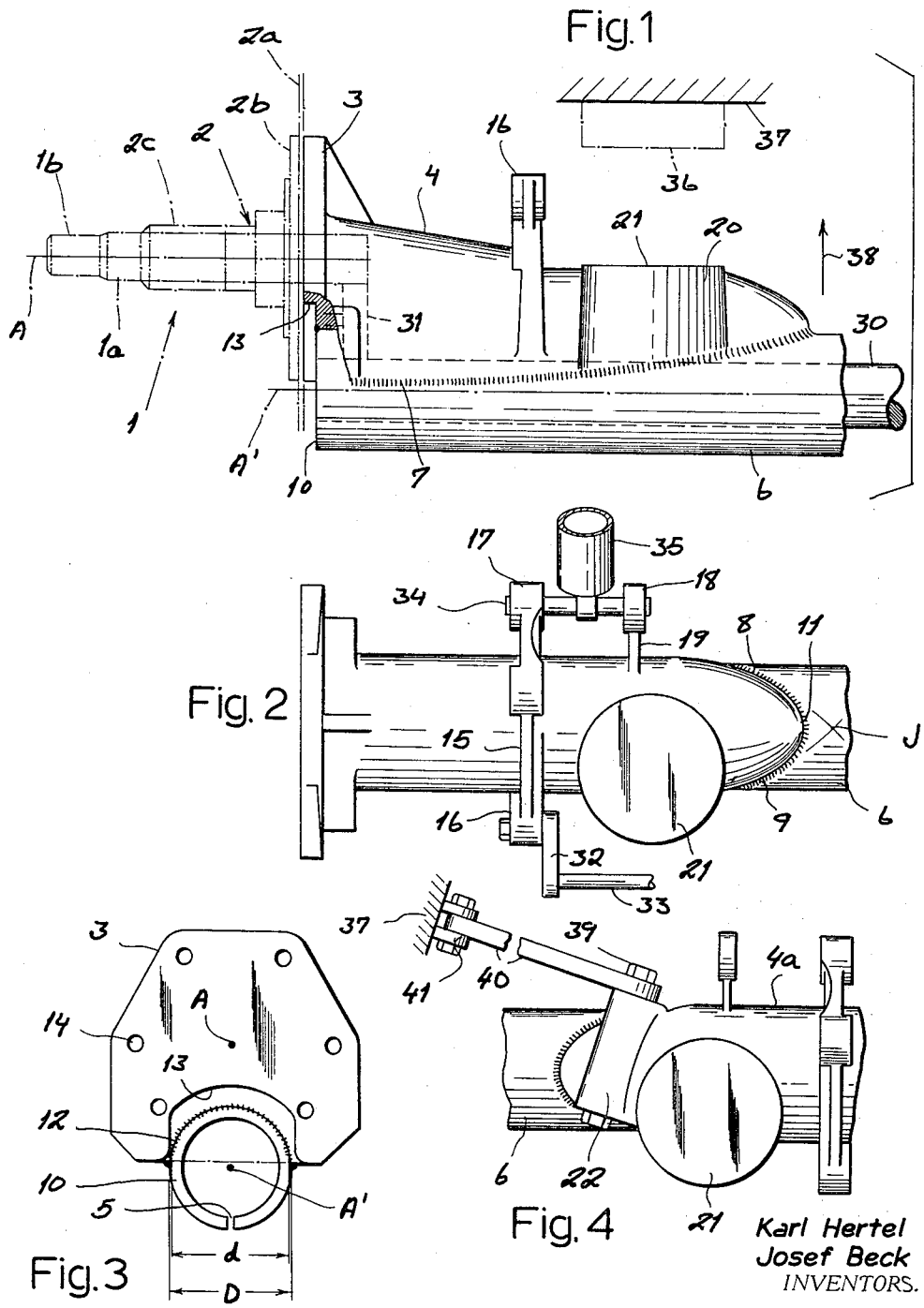

3,405,952
REAR-END ASSEMBLY FOR AUTOMOTIVE
VEHICLES
Karl Hertel, Plankstrasse 1, and Josef Beck, Blucherstrasse 8, both of Ingolstadt, Germany
Filed Dec. 21, 1966, Ser. No. 603,589
Claims priority, application Germany, Dec. 23, 1965,
A 51,169
10 Claims. (Cl. 280—124)

ABSTRACT OF THE DISCLOSURE

A rear-end assembly for automotive vehicles wherein the rear-axle housing, projecting laterally from the differential transverse to the vehicle direction, is provided at its end with support structures for the brake shield and wheel shaft bearings which are excentric relative to the axle sleeve, and the axle sleeve is offset from the wheel-shaft portions of the axle shaft therebelow and is provided with an axial slit to absorb torsional stresses applied to the axle sleeve. The support structure is a housing portion welded onto the cylindrical sleeve along generally longitudinal welds corresponding to sinusoidal lines of intersection of the housing portion and the sleeve. The support housing is formed with a flange adapted to be connected to the flange of the wheel-shaft bearing and with the brake shield as well as with a further flange or rib co-operating with a torsion-bar crank for the axle whereby the latter is swingable about a longitudinal axis of the vehicle and is floatingly or semifloatingly suspended by spring means therefrom.

Our present invention relates to a rear-end assembly for automotive vehicles and, more particularly, to improvements in live-axle assemblies for the driving wheels of automotive vehicles.

It is common practice in the automotive-vehicle field to provide floating or semifloating live-axle assemblies for the rear wheels of automotive vehicles which generally include an axle housing having a pair of housing sleeves extending transversely to the direction of vehicle travel and laterally from a differential and/or transmission housing; these systems provide the extremities of these sleeves with flanges to which the brake shield or support of a drum-type or disk brake can be fastened. These parts of the wheel-brake assemblies are relatively stationary and the axle shaft can pass through the sleeve beyond these stationary brake portions for fastening to the wheel hubs. In common rear-end constructions, the axle shaft is generally coaxial with the housing sleeve and the entire rear-axle assembly is resiliently suspended by shock-absorbing systems, springs and the like from the vehicle chassis. To this end, the differential and the axle housing are suspended by springs attached to the axle housing or by torque arms of a torque-tube suspension. A crank or the like may also be applied to the housing usually via an arm-attaching bracket connectable to a torque arm, the bracket being affixed to the axle housing.

A problem frequently encountered with conventional suspension and rear-end assemblies of the character described is that the axle housing lies relatively high with respect to the ground surface and the vehicle body or chassis cannot be as low-slung as desired. In rear-axle assemblies having this disadvantage, the trunk and rear-storage compartment must be of restricted capacity. Furthermore, a relatively high center of gravity is inevitable.

It is the principal object of the present invention to provide an improved rear-end assembly and suspension arrangement therefor, whereby the aforementioned difficulties can be avoided and the center of gravity of the vehicle lowered without material increase in the cost of the assembly.

Another object of this invention is to provide a rear-axle system capable of withstanding the stresses applied thereto and facilitating an increase in the load-carrying capacity of the vehicle.

Yet a further object of this invention is to provide a simplied and improved rear-axle assembly.

These objects and others which will become apparent hereinafter are attained in accordance with the present invention, in a system which comprises a rear-axle housing whose housing sleeves each extend laterally from the differential and outwardly therefrom and are provided at their extremities with support housings whose axes are offset above the axis of the axle sleeves so that the latter is, in turn, set below the axis of the rear wheels whose wheel shafts are driven through the support housings and whose bearing assemblies are connected thereto. The axle sleeves, according to this invention, which must withstand torsional stresses or torques because of the excentricity of the wheel axis relative to the axis of the axle sleeves, are longitudinally slit or split to withstand these stresses by slight resilient yieldability. In this manner, it is possible to lower the entire axle assembly (with the exception of the support housings at the ends of the axle sleeves) below the level of the wheel axis and thereby increase the useful space above the rear axle assembly to permit larger trunks or storage compartments.

According to a further feature of our invention, the axle sleeves, at least at their extremities remote from the differential housing, are of generally cylindrical configuration while the support housings are likewise generally cylindrical with parallel axes. Each downwardly open cast-metal support housing thus can be welded longitudinally to the cylindrical upper zone of the respective axle sleeve at the respective extremity thereof along a junction corresponding to a pair of intersecting sinusoidal weldments running from a horizontal axial plane of the sleeve at its extremity to a point on the upper cylindrical surface thereof inwardly from this extremity at the end of the support housing. Prior to the point of intersection of the sinusoidal line along which the weldments are located, the weld seam is rounded off to merge the two weldments. The separation of the ends of the weldments on the opposite sides of the support housing is preferably less than the diameter of the slit tube. We have found that the method of welding and configuration of the junction result in an optimum strength and indeed the success of the vertical offsetting of the support housing with respect to the axle sleeve is attributable in large measure to this configuration. Furthermore, the fact that this housing portion can be composed of a cast metal permits flanges, ribs and other formations to be provided thereon for the suspension springs, torsion bars, torsion-bar cranks or torque arms, arm-attaching brackets and the like which have heretofore been applied by friction clamps or the like to the axle housing. A complication arising from misalignment of these clamps and slippage of the connecting devices with respect to the axle housings are avoided and a rigid connection insured even when the housing sleeve itself is yieldable as indicated earlier.

In accordance with this latter aspect of the invention, the housing portion is provided at its outer extremity with a main connecting flange having an annular array of bores for receiving the bolts of the brake shield and wheel-shaft housing flange so that no special modification of the wheel-shaft structure is required. Furthermore, the housing portion overlying the axle sleeve is provided with a rib or flange having lugs or connecting eyes for the shock absorber or shock-damping member of the suspension as well as for a torsion crank which guides the axle sleeve, the housing portion, and the wheel in its vertical movement under the resilient action of the torsion bars or spring system. Additionally, we have found it desirable to provide an abutment on the upper surface of the housing portion adapted to engage an elastomeric bumper in an extreme upper position of the respective axle sleeve relative to the overlying vehicle body. The housing portion may also be formed at its end remote from the wheel with a throughgoing bore whereby a rod can be hingedly connected to the axle housing and to the chassis to prohibit sidewise movement of the axle sleeve and the respective wheel.

The above and other objects, features and advantages of the present invention will become more readily apparent from the following description, reference being made to the accompanying drawing in which:

FIG. 1 is a vertical elevational view, from the rear, of the left-hand end of a rear-axle assembly according to the present invention, the wheel-shaft portions being shown in dot-dash lines;

FIG. 2 is a plan view of the portion of the assembly of FIG. 1 illustrating diagrammatically a shock absorber and torque-suspension crank or arm-attaching bracket according to this invention;

FIG. 3 is an end view of the device of FIGS. 1 and 2; and

FIG. 4 is a view similar to FIG. 2 of the right-hand side of a modified assembly.

In FIGS. 1–3 of the drawing, we have shown in dot-dash lines a rear-wheel-shaft assembly generally designated 1 and comprising the splined wheel shaft 1a whose portion 1b extending outwardly from the wheel-shaft-bearing assembly 2 is connected to the hub of a wheel in the conventional manner and to the rotating brake portions in a conventional manner, e.g. as illustrated and described in Principles of Automotive Vehicles (TM-9-8000), U.S. Government Printing Office, Washington, D.C., January 1956, pages 426–429 and 353–360. The wheel shaft 1a is journaled in bearings within the cylindrical portion 2c of the wheel-shaft housing 2 which is formed with a flange 2b complementary to the flange 3 of a housing portion 4 illustrated in FIGS. 1 and 3 and described in greater detail hereinbelow. The brake shield 2a or stationary portion of a drum-type brake can be clamped between the flanges 2b and 3 by bolts in an annular array (e.g. at the vertices of a hexagon).

The housing portion 4 is generally cylindrical and defines via a mounting flange 3 a wheel axis A which is vertically offset above the axis A′ of the sleeve 6 of the axial housing which may be of the type generally described in Principles of Automotive Vehicles, supra, such that the sleeve 6 or either side of the differential are free to move in respective vertical planes about the longitudinal axis of the automotive vehicle. The housing portion 4 is downwardly open at its longitudinal circumference and rests upon the upwardly open cylindrical sleeve 6 so as to form a junction 7 along which a weldment 8, 9 welds the cast-steel or iron housing 4 to the sleeve 6. The junction 7 on opposite sides of the housing portion 4 commence at a horizontal plane P just above the axis A′ of the sleeve 6 at its end 10 such that the distance d between the seams is always less than the outer diameter D of the sleeve 6 (see FIG. 3). From the end 10 of the sleeve 6, the weld seams 8, 9 run along crossing sinusoidal lines whose junction is represented at J in FIG. 2. Prior to this intersection J, however, the symmetrical weld seams 8 and 9, which proceed along the curves 7, are rounded off at 11. The connecting portion 11 of the weld seams, of course, is disposed at the surface of the sleeve 6 diametrically opposite the longitudinal slot 5 (FIG. 3) formed therein.

The axle shaft 30 extends through the housing sleeve 6 as illustrated diagrammatically in FIG. 1 from the differential and is journaled in the housing 6 by the usual bearings (not shown). At their extremities, the axle shafts 30 may drive respective idler gears 31 of the respective housing portions 4 which, in turn, mesh with the wheel-drive shafts 1a to effect power transmission from the axle shafts 30 to the wheel shafts 1a. It will be understood that any other final drive can be used for this purpose including a universal joint.

At the extremity 10 of each of the sleeves 6, an arcuate weld seam 12 is provided between the base of a recess 13 in the flange 3 (FIG. 3) and the sleeve 6 to further secure the housing portion 4 to the sleeve. The flange 3 is, moreover, provided with threaded bores 14 at the vertices of the hexagon centered upon the axis A and adapted to receive the bolts securing the flange 2b and the brake shield 2a to the flange 3.

The flange 3 is cast integrally with the housing portion 4 which is also formed integrally with a transverse rib 15 which forms a web between a pair of eyes 16 and 17. The eye 16 serves as an anchor for the elastically yieldable crank arm 32 of a torsion bar assembly represented at 33. The eye 17 is aligned with a lug 18 held by a web 19 upon the support housing 4 and integrally formed therewith during the casting process. A bolt 34 is adapted to span the eye 17 and the lug 18 and to connect to the axle housing the lower end of the shock absorber or damper 35. The latter can be constituted by any of the conventional direct-action telescoping fluid-operated shock absorbers conventionally used. Upon its upper side, the support housing 4 is also integrally provided with an abutment block 20 whose upper surface 21 is an abutment engageable with a rubber bumper or cushion 36 affixed thereabove to the chassis or body 37. When the axle sleeve 6 moves upwardly against its torsion-bar and spring suspension (arrow 38) into its extreme position, the abutment 21 engages the cushion 36 as a stroke-limiting system.

In FIG. 4, we show a generally similar structure wherein, however, the support housing 4a is provided at its inward extremity with a projection 22 in which a throughgoing bore receives a bolt 39 to which a rod 40 is pivoted. The other end of the latter is fastened at 41 to the chassis 37 to limit lateral shifting of the sleeve 6 with the rear wheels.

The invention described and illustrated is believed to admit of many modifications within the ability of persons skilled in the art, all such modfications being considered within the spirit and scope of the appended claims.

We claim:

1. In a rear-axle assembly having a pair of rear-axle sleeves connected with a vehicle chassis by a resilient suspension, said sleeves extending transversely to the direction of movement of the vehicle and the longitudinal axis thereof and being provided with respective axle shafts, the improvement which comprises:
    (a) a support housing overlying each of said sleeves at a respective end thereof and connectable to a wheel-shaft-bearing housing so as to define respective wheel axes above the respective sleeve; and
    (b) a respective slot provided in each of said sleeves for yieldably relieving torsional stresses applied to the respective sleeves by the respective support housing.

2. The improvement defined in claim 1 wherein each of said sleeves in generally cylindrical and said support housing is generally cylindrical and parallel to the respective sleeve, said housing portion and the respective sleeve being joined together by a pair of symmetrical sinusoidal weld seams extending along opposite sides of said housing portion and merging in a rounded portion remote from the respective end of said sleeve, said seams having a horizontal spacing less than the horizontal diameter of the respective sleeve.

3. The improvement defined in claim 2 wherein said housing portion is composed of a cast metal and is integrally formed at the respective extremity of the respective sleeve with a transverse flange, said wheel-shaft-bearing housings each being connectable with the respective flange.

4. The improvement defined in claim 3 wherein each of said flanges is formed with an arcuate recess at the respective end of the respective sleeve and is welded arcuately to the respective sleeve within the respective recess.

5. The improvement defined in claim 3 wherein said flange is formed with a polygonal array of threaded bores for accommodating bolts attaching the wheel-bearing housing to the respective flange, said threaded bores surrounding an axis parallel to but vertically offset above the axis of said sleeve, said housing portions each being provided with means for connecting the respective axle shaft with the respective wheel shaft.

6. The improvement defined in claim 2 wherein each of said housing portions is integrally formed with at least one attachment formation securing a chassis connected torsion bar to said assembly for yieldably suspending the respective sleeve from the vehicle chassis.

7. The improvement defined in claim 2 wherein each housing portion is integrally formed with at least one abutment and the vehicle chassis is provided with a resilient bumper engageable with the respective abutment in an extreme upper position of the respective sleeve relative to said chassis.

8. The improvement defined in claim 2 wherein said housing portion is integrally provided with at least one formation anchoring a chassis connected shock absorber to the respective sleeve.

9. The improvement defined in claim 2 wherein said housing portion is formed integrally remote from the end of the respective sleeve with a projection securing a chassis connected guide rod to the respective sleeve to limit lateral movement thereof.

10. The improvement defined in claim 1 wherein each housing portion is integrally formed close to the end of the respective sleeve with a transverse flange provided with attachment means for securing said wheel-shaft housing to said housing portion, said wheel-shaft housing having a flange registering with and attachable to the flange of said housing portion for sandwiching a brake shield between said flanges, said housing portion being generally cylindrical and overlying said sleeve while forming generally sinusoidal junctions therewith on opposite sides of said housing portion, said sleeve and said housing portion being connected with a pair of weld seams along said junctions, said housing portion being composed of cast metal and being integrally formed with the respective flange and with at least one formation connecting a chassis connected torsion bar assembly to the respective sleeve, at least one formation anchoring a chassis connected shock absorber to the respective sleeve, at least one formation anchoring a chassis connected guide rod to said sleeve for preventing lateral movement thereof, and an abutment for engagement with a bumper overlying the respective sleeve and carried by the chassis of the vehicle.

No references cited.

MILTON KAUFMAN, *Primary Examiner.*